Figure 10:
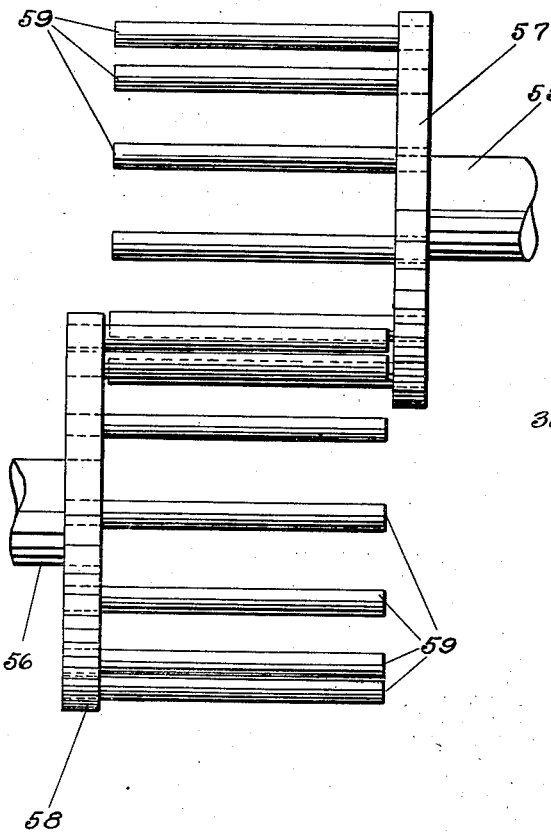

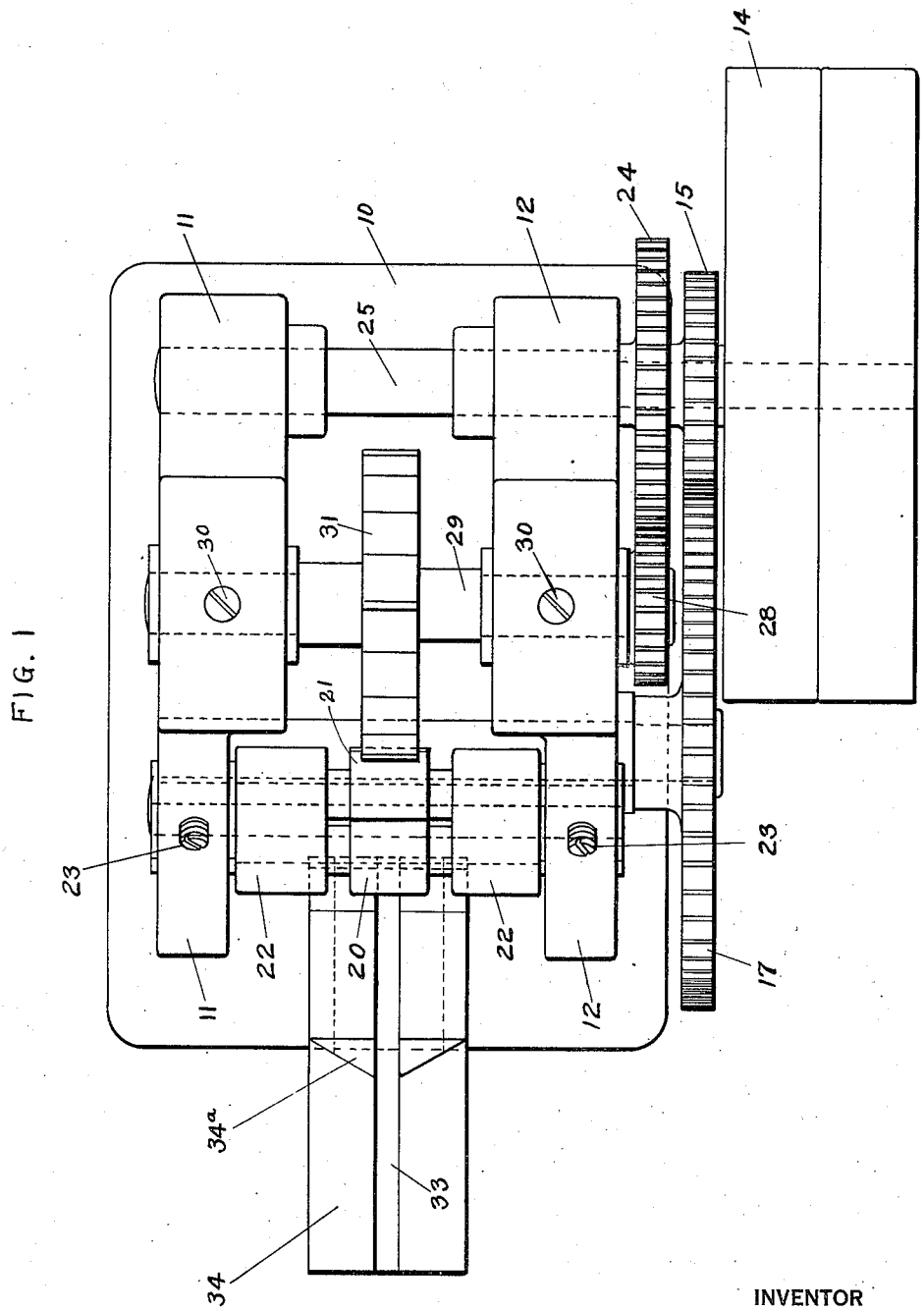

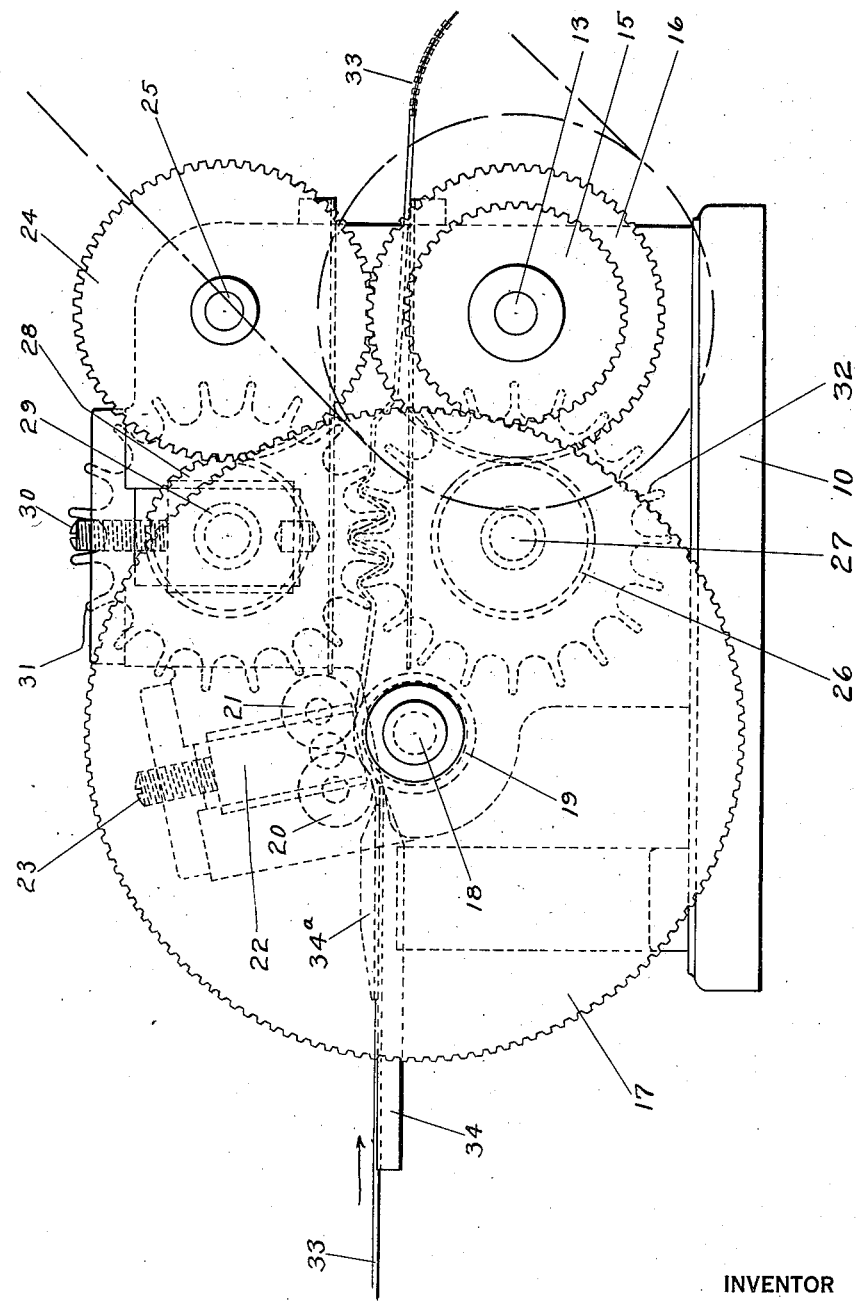

May 10, 1932.　　　G. SUNDBACK　　　1,857,669
TESTING AND FLEXING MACHINE
Filed Jan. 31, 1928　　　6 Sheets-Sheet 3
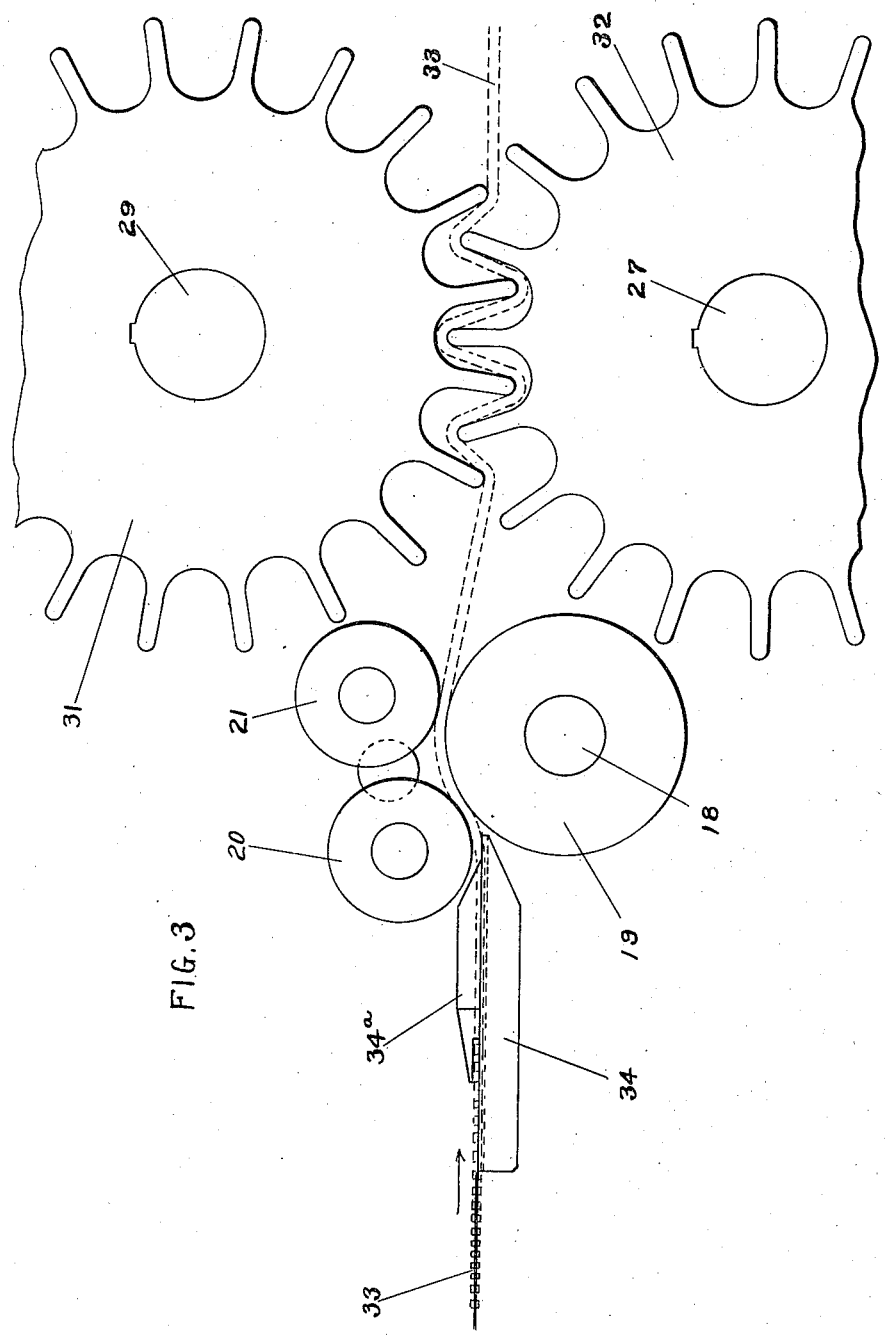
INVENTOR
*Gideon Sundback.*
BY
*Julian S. Wooster.*
ATTORNEY May 10, 1932.  G. SUNDBACK  1,857,669
TESTING AND FLEXING MACHINE
Filed Jan. 31, 1928   6 Sheets-Sheet 4
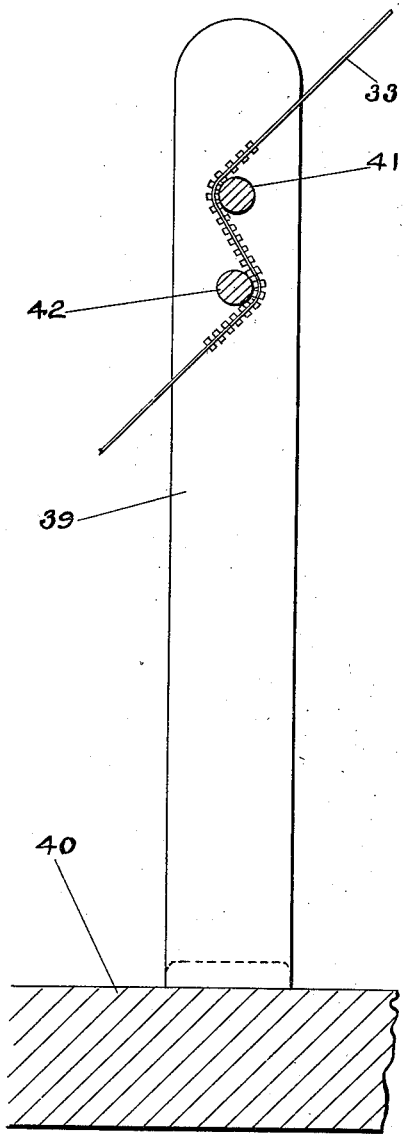
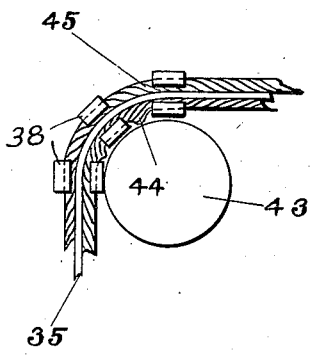
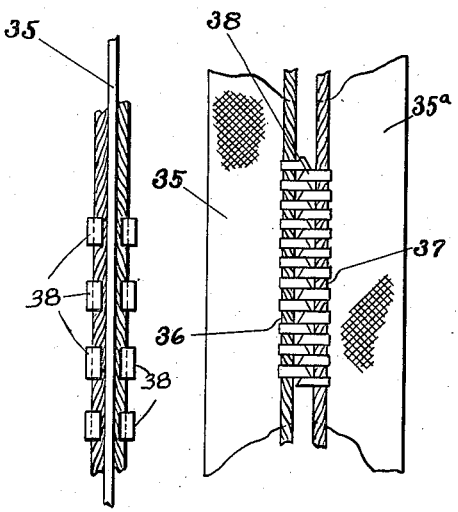
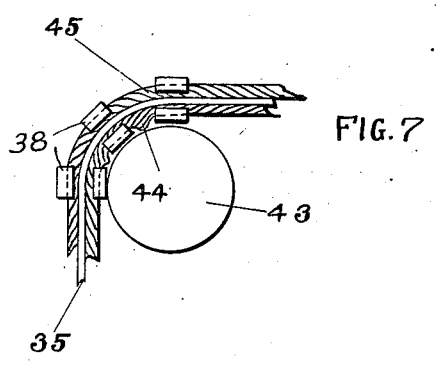
INVENTOR
Gideon Sundback.
BY
Julian S. Wooster.
ATTORNEY May 10, 1932.  G. SUNDBACK  1,857,669
TESTING AND FLEXING MACHINE
Filed Jan. 31, 1928  6 Sheets-Sheet 5
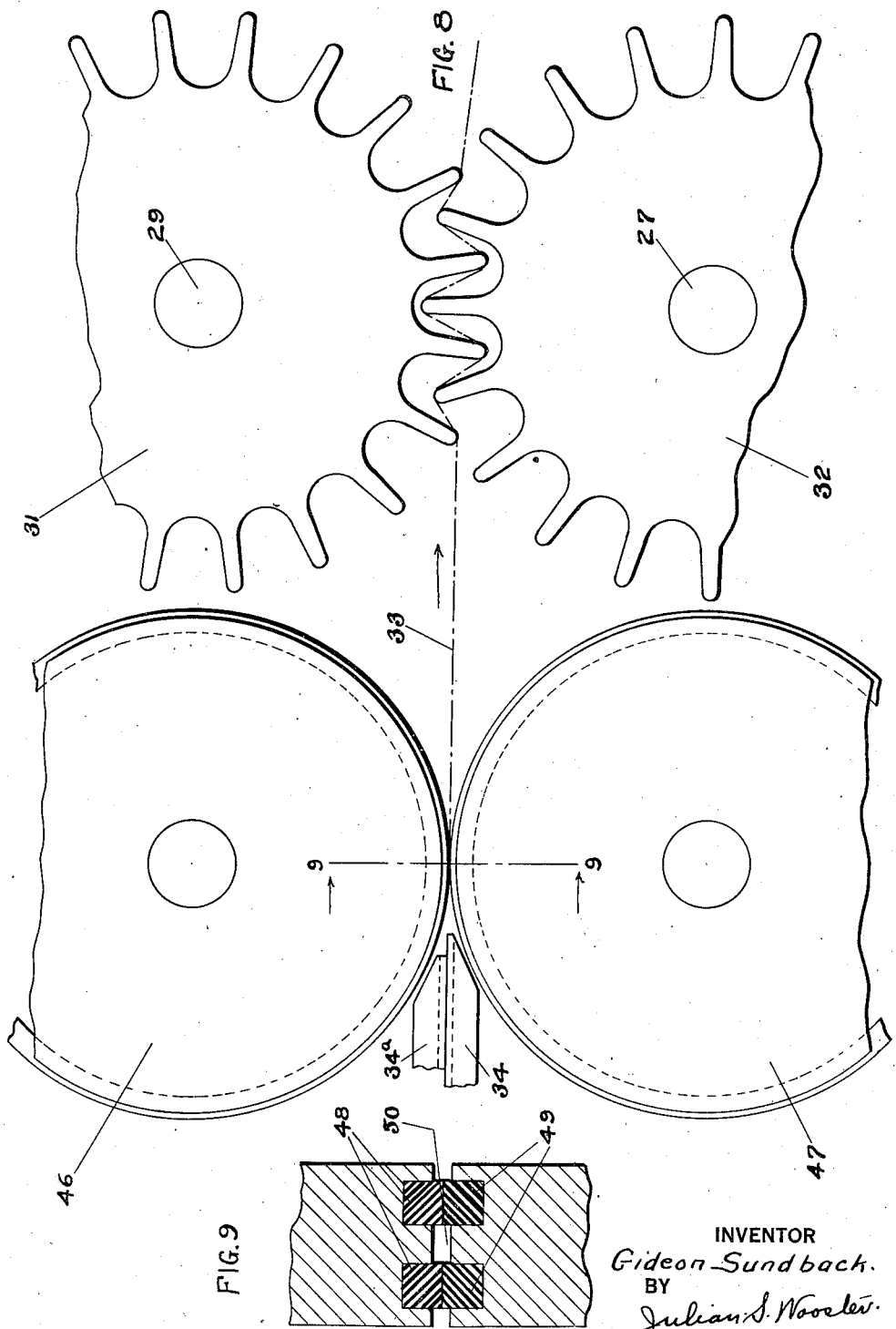

May 10, 1932.  G. SUNDBACK  1,857,669
TESTING AND FLEXING MACHINE
Filed Jan. 31, 1928   6 Sheets-Sheet 6

INVENTOR
Gideon Sundback.
BY
Julian S. Wooster.
ATTORNEY

Patented May 10, 1932

1,857,669

UNITED STATES PATENT OFFICE

GIDEON SUNDBACK, OF MEADVILLE, PENNSYLVANIA, ASSIGNOR TO HOOKLESS FASTENER COMPANY, OF MEADVILLE, PENNSYLVANIA, A CORPORATION OF PENNSYLVANIA

TESTING AND FLEXING MACHINE

Application filed January 31, 1928. Serial No. 250,928.

The invention relates to apparatus for testing and flexing strips of material such as separable fastener stringers.

An object of the invention is to provide simple and efficient apparatus for testing and flexing strips of material more rapidly, uniformly, thoroughly and economically than before.

Another object of the invention is to test and flex such strips of material in a single operation automatically and without the necessity of personal supervision.

The invention provides an apparatus having means for subjecting the strips to a testing and flexing action as they are passed therethrough. This action is achieved by passing the strip in contact with a series of staggered flexing and testing members causing the strip to travel a tortuous path through the apparatus so that they are flexed and tested.

One form of the invention provides means for gripping a strip of material and feeding it forward through the apparatus at a definite linear speed and means moving at a higher linear speed to engage the strip and subject it to a rubbing and flexing action.

More specifically, the apparatus comprises retarding rolls between which the strip first passes and flexing and rubbing means in the form of a member moving at higher linear speed and having a tortuous channel through which the strip passes. The dragging action on the strip of the retarding rolls causes the flexing members to rub as well as flex the strip.

The invention is particularly applicable to the testing and flexing of stringers or strips of separable fasteners and the strips are preferably continuously run through the apparatus in pairs with the fastener elements on each pair interlocked. As these strips pass through they are gripped by the retarding rolls and pass to the flexing members and subjected to a flexing action and are rubbed as well due to the higher linear speed of said flexing members. This flexing and rubbing will make the fabric and corded braid of the strips more flexible, will smooth off any rough uneven surfaces on the metal parts, but equally important it will test and work in the union between the interlocked elements and their engagement with the strips so that if they are defective in any of these respects it will show up in this test.

Figure 11:
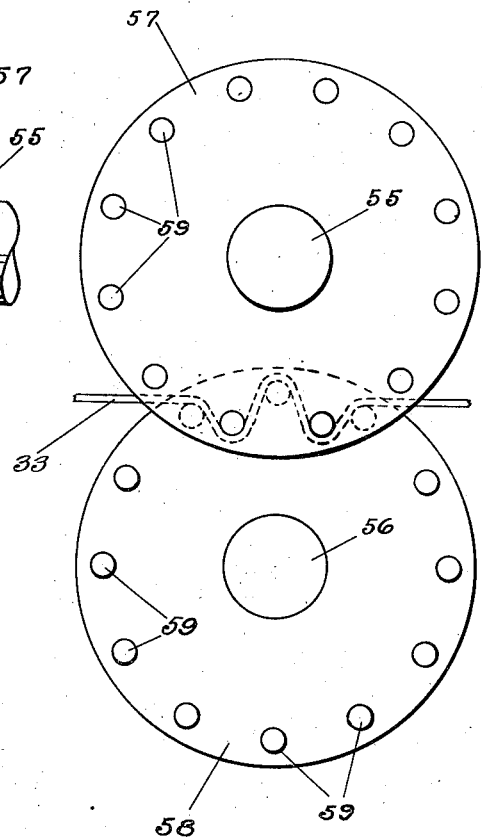
Figure 12:
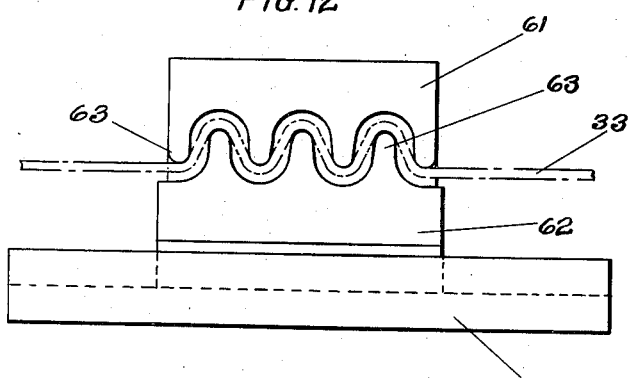

This invention is illustrated in the drawings of which:

Fig. 1 is a plan view of the apparatus embodying the invention;
Fig. 2 is a side elevation thereof;
Fig. 3 is an enlarged side elevation of the flexing elements and retarding rolls with a fastener passing therethrough;
Fig. 4 is an elevation partly in section showing in simplified form the method of testing and flexing fastener strips by causing them to travel through a tortuous path over staggered testing and flexing members;
Fig. 5 is an enlarged side view of a fastener stringer;
Fig. 6 is a plan view of a pair of stringers having their cooperating interlocking members engaged;
Fig. 7 is an enlarged side view showing how the strip is compressed and expanded during flexing;
Fig. 8 is an enlarged partial side elevation of a modified form of the apparatus;
Fig. 9 is a section taken on the line 9—9 of Fig. 8;
Fig. 10 is an end view of a modification of the apparatus;
Fig. 11 is a side view of Fig. 10; and
Fig. 12 is another modification of the apparatus.

As shown in the drawings, a preferred form of the apparatus comprises a bed-plate 10, on which are bearing pedestals 11 and 12, supporting a shaft 13, the outer end of which carries a pulley 14 connected to a suitable source of power. The shaft 13 is provided with gears 15 and 16. Gear 15 meshes with gear 17 mounted on shaft 18 supported in the pedestals 11 and 12. This shaft carries a retarding roller 19, against which a pair of idler pressure rollers 20 and 21 bear. These pressure rollers are supported in bearing blocks 22 which can be adjusted by means of the screw 23 to vary the pressure on the retarding roller 19.

The gear 16 meshes with a gear 24 on shaft 25 supported in the bearing pedestals 11 and 12, and with a gear 26 mounted on shaft 27 also supported in bearing pedestals 11 and 12. The gear 24 meshes with a gear 28 mounted on shaft 29 which is supported in the bearing pedestals 11 and 12 and is adjustable vertically by means of screws 30. Shaft 29 carries a toothed gear 31. The shaft 27 carries a similar toothed gear 32. The teeth of gears 31 and 32 are adapted to move in spaced relation to each other to form a tortuous channel as clearly shown in Fig. 2, through which the strip to be flexed passes. The depth of this channel can be varied by the adjustment of the upper toothed gear 31 with respect to the lower toothed gear 32 to vary the degree of flexing. The strip to be flexed is indicated by the numeral 33 and is fed onto a platform 34 beneath a guide plate 34a between the retarding roller 19 and the pressure rollers 20 and 21 and then between the teeth of the flexing gears 31 and 32.

In one application of this apparatus, strips or stringers of separable fasteners are to be tested and flexed. These stringers are generally of the form shown in Figs. 5 and 6 and comprise strips of fabric 35 and 35a along the adjacent edges of which are sewed corded braid members 36 and 37, to which are fastened metallic members such as 38 provided with corresponding projections and recesses adapted to be interlocked. The strips 35 and 35a are generally fed through the machine in pairs with the metallic members interlocked and the action of the apparatus in flexing the strip and the metallic parts will test the engagement of the metallic members with the strips and with each other.

In Fig. 4 showing a simplified form of the tortuous travel of a strip over staggered flexing and testing members, a pedestal 39 mounted on base 40 is provided with pins 41 and 42. The strip material 33, in pairs, with the metallic members interlocked, is passed either in one direction or back and forth between pins, as shown, to provide the desired flexing and rubbing or testing. In this way, the series of fastener elements are flexed, first in one direction and then in the other to test not only their union but their engagement with the fabric of the strip. This strip may be fed forward and backward, either by hand or by suitable mechanical means.

In Fig. 7 a portion of a strip is shown passing over a pin 43 indicating the manner in which the lower portion 44 of the strip is depressed and the upper part 45 is expanded. As the strip is flexed in the opposite direction, the compressive and expansion action is reversed.

In Figs. 8 and 9 is shown a form of apparatus similar to the one previously described, with the exception that the retarding and pressure rollers 19, 20 and 21 are replaced by finishing rollers 46 and 47. These rollers are adapted to press on the metal parts of the stringers to roll them to their final size, but at the same time to control the speed of the strip or stringer as it travels through the flexing gears 31 and 32. As shown in Fig. 9 the peripheries of the rollers 46 and 47 are provided with pairs of rubber rings 48 and 49 which are spaced apart laterally on the periphery of the rollers to engage with the fabric of the stringers, the space 50 between the rubber rings being of proper dimension both laterally and radially to permit of the passage of the metal parts on the stringer and subject them to the required finishing pressure. Consequently in passing a continuous length of stringers through the apparatus the rubber rings will at all times grip the fabric and control its speed. This is necessary because in making continuous lengths of stringers with interlocking elements thereon, the metal elements are arranged in groups with a portion of fabric between the groups which, as they pass through the apparatus, would not be engaged by the rollers 46 and 47 if it were not for the rubber rings 48 and 49.

In the operation of the apparatus, which is particularly shown in Fig. 3, the strip of stringers with interlocking members thereon are fed forward by the roller 19 beneath the adjacent pressure rollers 20 and 21 and thence pass between the teeth of the testing and flexing gears 31 and 32. Because of the tortuous channel provided between these teeth by reason of their adjustable spacing, the strip is flexed back and forth. The gear ratios in the apparatus are so proportioned that the linear speed at the teeth of the gears 31 and 32 is considerably greater than the linear speed of the retarding roller 19. Thus the strip having been fed forward by the roller 19 beneath the adjacent rolls 20 and 21 is frictionally engaged by the flexing gears 31 and 32 and because of the higher linear speed of said flexing gears, the feed rollers 19, 20 and 21 become retarding rolls, controlling the speed of the strip so that the linear speed thereof will not be as high as the linear speed of the said flexing gears. Therefore, the teeth not only flex the strip but exert a rubbing action thereon which causes the sockets and recesses of the interlocking metal members to be moved relatively with a rolling rubbing motion while they are in engagement. This action insures a more perfect engagement between the interlocking members by tending to remove or wear away any irregularities or burrs that might have been formed in the manufacture of the members. The corded braid or edges 36 and 37 on the adjacent edges of the fabric strips 35 and 35a are likewise flexed and become more pliable. This flexing motion gives pliability to the entire strip including the metal members so that after being tested a smoother action is insured.

This flexing is also a test to determine defective parts, not only in the engagement of the metal members but in their engagement with the fabric, and therefore if the members are not co-related with sufficient strength or accuracy this test will cause a separation either of the metal members from each other or from the fabric to which they are engaged.

In Figs. 10 and 11 is shown a modified form of the flexing elements previously described, this form consisting of shafts 55 and 56 with discs 57 and 58 respectively mounted thereon, said discs being fitted with a plurality of pins 59 spaced along the periphery thereof, which alternately pass in spaced relation to one another forming a tortuous path for the fastener and through which the fastener passes as shown in Fig. 11. The depth of this channel may be varied as previously described for the toothed flexing gears to vary the degree of flexing.

In Fig. 12 is shown still another modification of the flexing elements, consisting of blocks 61 and 62 having projections 63, said blocks being so positioned in relation to one another that the projections 63 will be alternately spaced forming a tortuous path as clearly shown in Fig. 12. The fastener strip is there drawn through the said tortuous channel. The motion may be continuous in one direction only or reciprocating as desired, or the fastener may be held still and the blocks 61 and 62 moved along slide 64, either continuously in one direction only or reciprocating as desired. In order to speed up the work both fastener and flexing means may be movable thus shortening the stroke of each.

Consequently, in this apparatus the fasteners are flexed more rapidly, uniformly and thoroughly than by hand so that each portion of the length of the strip both fabric and metal will receive the same degree of testing and flexing and at a much higher rate of speed than has hitherto been possible.

I claim:

1. A testing and flexing apparatus for strip material comprising a pair of cooperating rotatable feed members having means for flexing and rubbing said strip between them, means for rotating said members to feed said strip forward, and means for retarding the speed of passage of said strip between said members.

2. A testing and flexing apparatus for strip fasteners comprising means engaging the strip to flex and test it, means feeding the strip continuously to the flexing and testing means, said flexing means tending to pull the strip through the apparatus faster than it is advanced by the feeding means.

3. In a testing and flexing apparatus for strip fasteners, a plurality of means for feeding the strip through the apparatus, one of said means adapted to have slipping engagement with the strip, and having flexing means forcing the strip to take a tortuous path, another of said means adapted to regulate the linear speed of the strip through the apparatus.

4. In a testing and flexing apparatus for strip fasteners, a flexing and testing means to feed the strip along in a tortuous path and to cause a continuous pull on said strip, and means to feed the strip in a linear path to said flexing and testing means.

5. In a testing and flexing apparatus for strip fasteners, a flexing and testing means to feed the strip along in a tortuous path and having slipping engagement therewith, means to feed the strip in a linear path to said flexing and testing means at a regulated linear speed, said flexing and testing means having a higher linear speed.

6. A testing and flexing apparatus for strip material comprising a pair of members having alternately spaced portions cooperating to bend and flex said strip between them, and means for moving said members at a linear speed substantially different from the speed of said strip relatively to said strip.

7. A testing and flexing apparatus for strip material comprising means for feeding the strip through the apparatus at a definite linear speed and means moving at a higher linear speed adapted to engage the strip and subject it to a rubbing and flexing action.

8. A testing and flexing apparatus for strip material comprising a toothed gear having a definite linear speed and means cooperating therewith to provide a tortuous channel through which the strip extends and during its passage through which the strip is flexed.

9. A testing and flexing apparatus for strip material comprising flexing means, having a tortuous channel through which the strip extends, said member having a definite linear speed and means engaging the strip to retard its speed below that of the flexing member so that the strip is rubbed as well as flexed by engagement with the walls of the tortuous channel.

10. A testing and flexing apparatus for strip material comprising a toothed gear having a definite linear speed, means cooperating therewith to provide a tortuous channel through which the strip extends, during its passage through which the strip is flexed and means for retarding the linear speed of the strip below that of the gear so that the strip is rubbed as well as flexed in its passage through the channel.

11. A testing and flexing apparatus for strip material comprising a pair of toothed gears adjustably spaced to provide a tortuous channel through which the strip extends, and means to retard the linear speed of the strip below that of the gears to cause relative movement between the teeth and the strip.

12. A testing and flexing apparatus for strip material comprising a pair of toothed gears adjustably spaced to provide a tortuous channel through which the strip extends, and retarding rollers having a linear speed below that of the toothed gears and engaging the strip in advance of the toothed gears.

13. A testing and flexing apparatus for strip material comprising a pair of toothed gears having their teeth spaced to provide a tortuous channel through which the strip extends and during its passage through which the strip is flexed and rubbed.

14. A testing and flexing apparatus for strip material comprising a pair of toothed gears adjustably spaced to provide a tortuous channel through which the strip extends, said gears having a definite linear speed, and a pair of finishing rollers having a lower linear speed, said rollers adapted to engage a predetermined portion of the strip and laterally spaced flexible rings on the peripheral surface of said finishing rollers adapted to engage predetermined other portions of said strip.

15. In a testing and flexing apparatus for strip fasteners, means for feeding the strip through the apparatus at a regulated linear speed and a reciprocating flexing and testing device having slipping engagement with the strip, said device acting to maintain tension on the strip fed from said feeding means.

16. In a testing and flexing apparatus for strip fasteners, means for feeding the strip through the apparatus at a regulated linear speed and a reciprocating flexing and testing device having a tortuous channel through which the strip passes and having slipping engagement with the strip, the linear speed of the flexing and testing device being greater than that of the feeding means.

17. A testing and flexing apparatus for strip material comprising a pair of toothed gears having their teeth cooperating in spaced relation to feed said strip forward in a tortuous path, means for adjusting one of said gears with respect to the other to vary the degree of flexing, and means for feeding said strip under tension to said gears to cause substantial linear slipping movement between said strip and gears.

18. A rolling and flexing apparatus for interlocking fasteners of the type having a pair of flexible stringers and interlocking fastener elements on the adjacent edges of the stringers which comprises a pair of feed rolls for feeding the stringers at a definite linear speed, cooperating portions on said rolls to engage the metal fastener elements and compress them to uniform width, and flexing means having slipping engagement with said stringers to flex all parts of the fastener after passing through said rolls.

Signed at Meadville, in the county of Crawford and State of Pennsylvania, this 27th day of January, A. D. 1928.

GIDEON SUNDBACK.